UNITED STATES PATENT OFFICE.

ARTHUR HOWE CARPENTER, OF SAWPIT, COLORADO, ASSIGNOR TO THE COLORADO VANADIUM CORPORATION, OF SAWPIT, COLORADO, A CORPORATION OF COLORADO.

PROCESS FOR RECOVERING VANADIUM.

1,396,992.  Specification of Letters Patent.  Patented Nov. 15, 1921.

No Drawing.  Application filed November 29, 1919  Serial No. 341,484.

*To all whom it may concern:*

Be it known that I, ARTHUR HOWE CARPENTER, a citizen of the United States of America, and residing in Sawpit, in the county of San Miguel and State of Colorado, have invented certain new and useful Improvements in Processes for Recovering Vanadium, of which the following is a specification.

This invention relates to improvements in process for recovering vanadium.

The invention provides a process wherein the vanadium may be recovered with greater ease and completeness than heretofore.

According to the present invention vanadium ores or vanadium compounds, such as calcium vanadate or iron vanadate are mixed with sodium chlorid, a relatively stable alkali metal salt, such as soda ash, and sulfur, or a compound of sulfur such as sodium sulfid or iron sulfid, the mixture then being roasted so as to transpose the vanadium compound to a compound soluble in water.

As a particular example of the process, a vanadium ore, such as roscoelite containing about 2 or 3 per cent. vanadium is mixed with the following proportions of the following substances:

| | |
|---|---|
| Sodium chlorid | 6% |
| Soda ash | 2% |
| Sodium sulfid | 2% |

The percentages given are in proportion to the weight of the ore.

The mixture is then heated at a roasting temperature, for example, 750 degrees C., the duration of the roasting depending upon the mass being treated, and the efficiency of the apparatus in which the roasting is carried on.

After the roasting has been completed, and the vanadium compound in the ore is transposed to a soluble compound, water is added to the roasted mixture and the soluble vanadium compound leached or dissolved out of the roasted mixture, the water solution containing the vanadium compound being thereafter run off, leaving behind the gangue and other insoluble compounds. The dissolving or leaching is preferably done with hot water.

The vanadium may be recovered from the solution in any suitable manner.

Other specific ways of carrying out the process, within the idea of the invention, will readily suggest themselves to those versed in the art. Moreover, the proportions of the substances mixed with the ore or vanadium compound will depend upon the concentration of the ore and the compounds in which the vanadium occurs.

What is claimed is:—

1. A process of recovering vanadium from its ores and compounds, comprising mixing the ore or compound with sodium chlorid, a relatively stable alkali metal salt, and a sulfur-containing material and roasting to transpose the vanadium compound to a compound soluble in water.

2. A process of recovering vanadium from its ores and compounds, comprising mixing the ore or compound with sodium chlorid, soda ash and a sulfur-containing material, and roasting to transpose the vanadium compound to a compound soluble in water.

3. A process of recovering vanadium from its ores and compounds, comprising mixing the ore or compound with sodium chlorid, a relatively stable alkali metal salt, and a sulfid and roasting to transpose the vanadium compound to a compound soluble in water.

4. A process of recovering vanadium from its ores and compounds, comprising mixing the ore or compound with sodium chlorid, a relatively stable alkali metal salt, and iron sulfid, and roasting to transpose the vanadium compound to a compound soluble in water.

In witness whereof, I have hereunto signed my name.

ARTHUR HOWE CARPENTER.